(12) United States Patent
Yamanaka et al.

(10) Patent No.: US 7,376,678 B2
(45) Date of Patent: May 20, 2008

(54) DATABASE MANAGEMENT PROGRAM AND RECORDING MEDIUM

(75) Inventors: Minoru Yamanaka, Kawasaki (JP); Jo Ajisawa, Kanagawa (JP); Shuji Sekiya, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 10/118,147

(22) Filed: Apr. 9, 2002

(65) Prior Publication Data
US 2003/0120689 A1   Jun. 26, 2003

(30) Foreign Application Priority Data
Dec. 21, 2001   (JP)   ............... 2001-389712

(51) Int. Cl.
*G06F 12/00*   (2006.01)

(52) U.S. Cl. ............... 707/205; 707/201; 707/202; 707/204; 707/206; 711/133; 711/113

(58) Field of Classification Search ........ 707/100–205, 707/206; 711/205–209, 112–115, 118, 133, 711/134–136; 369/11, 30, 47.1, 53.41
See application file for complete search history.

(56) References Cited

U.S. PATENT DOCUMENTS

| | | | | |
|---|---|---|---|---|
| 5,276,867 | A | * | 1/1994 | Kenley et al. ............... 707/204 |
| 5,440,692 | A | * | 8/1995 | Janicek ........................ 707/101 |
| 5,457,793 | A | * | 10/1995 | Elko et al. ................... 707/205 |
| 5,481,702 | A | * | 1/1996 | Takahashi .................... 707/205 |
| 5,687,343 | A | * | 11/1997 | Fecteau et al. ............. 711/202 |
| 5,809,516 | A | * | 9/1998 | Ukai et al. ................... 711/114 |
| 5,809,527 | A | * | 9/1998 | Cooper et al. ............... 711/133 |
| 5,822,780 | A | * | 10/1998 | Schutzman .................. 707/204 |
| 5,832,484 | A | * | 11/1998 | Sankaran et al. ............... 707/8 |
| 5,937,434 | A | * | 8/1999 | Hasbun et al. ............... 711/173 |
| 6,157,927 | A | * | 12/2000 | Schaefer et al. ........ 707/103 R |
| 6,185,663 | B1 | * | 2/2001 | Burke ........................ 711/156 |
| 6,199,179 | B1 | * | 3/2001 | Kauffman et al. ............ 714/26 |
| 6,275,830 | B1 | * | 8/2001 | Muthukkaruppan et al. .......................... 707/205 |
| 6,311,290 | B1 | * | 10/2001 | Hasbun et al. ............... 707/202 |
| 6,324,692 | B1 | * | 11/2001 | Fiske ......................... 717/171 |
| 6,330,572 | B1 | * | 12/2001 | Sitka ......................... 707/205 |
| 6,397,379 | B1 | * | 5/2002 | Yates et al. .................. 717/140 |
| 6,411,964 | B1 | * | 6/2002 | Iyer et al. .................... 707/205 |
| 6,430,714 | B1 | * | 8/2002 | McAdam et al. ........... 714/704 |
| 6,470,424 | B1 | * | 10/2002 | Adams ........................ 711/133 |
| 6,549,959 | B1 | * | 4/2003 | Yates et al. .................... 710/22 |

(Continued)

*Primary Examiner*—Cam Y Truong
*Assistant Examiner*—Anh Ly
(74) *Attorney, Agent, or Firm*—Staas & Halsey LLP

(57) ABSTRACT

A database management program capable of restoring a use management book indicating allocation/non-allocation of data to individual unit storage regions, without the need to perform physical initialization at the time of reinitialization. When the database is initialized, all allocation flags provided in the use management book and indicative of allocation/non-allocation of data to the respective unit storage regions are set to a non-allocated state, and the value of an initialization counter indicative of the number of times the database has been initialized is updated. Each time data is allocated to one of the unit storage regions in the database, the allocation flag in the use management book corresponding to the data-allocated unit storage region is set to an allocated state, and the value of the initialization counter is set as an allocation-timed counter value associated with the data-allocated unit storage region.

6 Claims, 17 Drawing Sheets

U.S. PATENT DOCUMENTS

| | | | |
|---|---|---|---|
| 6,560,606 B1 * | 5/2003 | Young | 707/100 |
| 6,594,660 B1 * | 7/2003 | Berkowitz et al. | 707/8 |
| 6,631,478 B1 * | 10/2003 | Wang et al. | 714/15 |
| 6,658,437 B1 * | 12/2003 | Lehman | 707/205 |
| 6,668,263 B1 * | 12/2003 | Cranston et al. | 707/205 |
| 6,732,111 B2 * | 5/2004 | Brodersen et al. | 707/101 |
| 6,732,349 B1 * | 5/2004 | Sun et al. | 716/16 |
| 6,754,680 B1 * | 6/2004 | Motomura et al. | 707/202 |
| 6,763,428 B1 * | 7/2004 | Cappon | 711/112 |
| 6,839,725 B2 * | 1/2005 | Agesen et al. | 707/206 |
| 7,013,305 B2 * | 3/2006 | Elko et al. | 707/100 |
| 2002/0059279 A1 * | 5/2002 | Kim et al. | 707/100 |
| 2002/0092010 A1 * | 7/2002 | Fiske | 717/168 |
| 2003/0023617 A1 * | 1/2003 | Hunt et al. | 707/202 |
| 2004/0024795 A1 * | 2/2004 | Hind et al. | 707/204 |

\* cited by examiner

110 DICTIONARY

| DB NO. | INITIALIZATION STATE | INITIALIZATION COUNTER |
|---|---|---|
| DB#1 | ACT | 0000 |
| DB#2 | INT | 0000 |
| DB#3 | NON | - |

FIG. 6

TRANSITION OF DATA IN DICTIONARY

DATABASE MANAGEMENT PROGRAM AND RECORDING MEDIUM

BACKGROUND OF THE INVENTION (1) Field of the Invention

The present invention relates to a database management program and a computer-readable recording medium having the database management program recorded thereon, and more particularly, to a database management program for managing the use/nonuse of individual unit storage regions of a database by means of a use management book, and to a recording medium having such a database management program recorded thereon.

(2) Description of the Related Art

There has been a demand for techniques that enable a server computer (database server) associated with a database to efficiently access data. As one of such techniques enabling fast access to a database, there is a method wherein a page management book is used to manage the status of use of individual pages each constituting a unit storage region of the database.

FIG. 17 schematically shows a data structure in a conventional database server. The database server 900 comprises a database 910, a dictionary 920, and a page management book 930.

The database 910 includes a plurality of pages 911 to 918 each constituting an input/output unit storage region. The pages 911 to 918 individually store a plurality of records. The dictionary 920 manages definition information (record information, column information, etc.) and status (data accumulation status or backup status) of the database 910. The page management book 930 manages the status of use (allocation/non-allocation) of the individual pages 911 to 918 in the database 910. Specifically, in the page management book 930, flags indicating whether data is allocated to the respective pages 911 to 918 or not are set in association with the page numbers of the respective pages 911 to 918. In the example shown in FIG. 17, dark circle (●) represents a flag indicating data-allocated state and circle (○) represents a flag indicating blank state (non-allocated state).

With the database server 900 configured as above, by looking up the page management book 930, it is possible to promptly determine which pages in the database 910 are in use and which pages are blank. As a consequence, the database 910 can be accessed efficiently and at high speed.

In the database server 900 described above, it is probable that the content of the page management book 930 is destroyed due to an input/output fault or the like during operation. If such destruction occurs, all pages in the database 910 are looked up to ascertain their status of use. In the process for ascertaining the use status, those pages storing valid data are judged data-allocated pages, while those pages storing invalid data (e.g., data whose values are all "0") are judged blank pages. The page management book 930 can then be restored in accordance with the results of ascertainment of the contents of data in the individual pages 911 to 918.

Thus, the restoration process for the page management book 930 is executed on the precondition that blank page stores invalid data. To this end, in an initialization process for the database 910, it is essential to physically initialize all pages in the database 910. Physically initializing a page means writing invalid data, as data, into the page. Such physical initialization makes it possible to accurately determine the status of use of the individual pages in the page management book restoration process.

In the initialization process for the conventional database, however, since all pages need to be physically initialized, more and more time is required to initialize the database because the amount of data handled per database server is increasing. Especially, in recent years, the field of business utilizing information communication technology is expanding, entailing an increase in the amount of data handled per database server and consequent enlargement of the scale of databases. As a result, the initialization of a database requires considerable time, and lowers the operation efficiency of the database server.

Among various forms of operation of database server, there is a type wherein operator's operation history is accumulated. For example, in the case of a transaction system for financial institutions, it is necessary that operator's operation history be accumulated in sequence.

A database server for accumulating such operation history generally comprises a plurality of databases. Three databases, for example, are provided such that while the operation history is accumulated in one database, the other two databases are backed up and initialized, respectively. When the initialization of one database is finished, the operation history starts to be accumulated in this database. The database which has been backed up is then reinitialized for the subsequent use, and the database which has accumulated the operation history is backed up upon completion of the accumulation.

Namely, the database server for accumulating the operation history continuously operates in a manner such that the data accumulation, backup, and reinitialization are cyclically carried out with the multiple databases switched. In cases where multiple databases are operated while being switched in this manner, it is necessary that the storage area of the database currently accumulating the operation history should not be exhausted before the initialization of the database which is to accumulate the operation history next is completed.

However, in the case of online transactions conducted in financial business, for example, in which a large amount of operation history is generated, it is difficult to estimate the required capacity of the databases for accumulating the operation history (taking account of time periods needed for the backup operation and the initialization, as well as the operation history generation frequency). Consequently, in order to prevent the storage areas of the databases from being exhausted, a storage capacity much larger than the data capacity actually used needs to be allocated for each of the databases.

Thus, the physical initialization performed at the time of reinitialization of databases lowers the operation efficiency and also constitutes a cause of unnecessary increase in database capacity.

As mentioned above, physical initialization is performed at the time of reinitialization in order that a determination as to whether data has been allocated to the individual pages or not can be made based on the validity of data in the respective pages when the page management book is to be restored. Thus, if the page management book can be restored without checking the validity of data in the individual pages, then physical initialization need not be carried out at the time of reinitialization. If no physical initialization is required at the time of reinitialization, the reinitialization can be completed in a short time even in the case where the scale of databases is enlarged.

SUMMARY OF THE INVENTION

The present invention was created in view of the above circumstances, and an object thereof is to provide a database management program which is capable of restoring a management book indicating the allocation/non-allocation of data to individual unit storage regions, without the need to carry out physical initialization at the time of reinitialization, and a recording medium having such a database management program recorded thereon.

To achieve the object, there is provided a database management program for managing allocation/non-allocation of data to individual unit storage regions of a database by means of a use management book. The database management program causes a computer, when the database is initialized, to set all of allocation flags provided in the use management book and indicative of allocation/non-allocation of data to the respective unit storage regions to a non-allocated state and to update a value of an initialization counter indicative of a number of times the database has been initialized, and causes the computer, each time data is allocated to one of the unit storage regions in the database, to set the allocation flag in the use management book corresponding to the data-allocated unit storage region to an allocated state and to set the value of the initialization counter as an allocation-timed counter value associated with the data-allocated unit storage region.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 is a diagram showing an exemplary data structure of a dictionary;

DESCRIPTION OF THE PREFERRED EMBODIMENTS

Embodiments of the present invention will be hereinafter described with reference to the drawings.

An outline of the invention applied to the embodiments will be explained first prior to detailed description of the embodiments.

Figure 1:
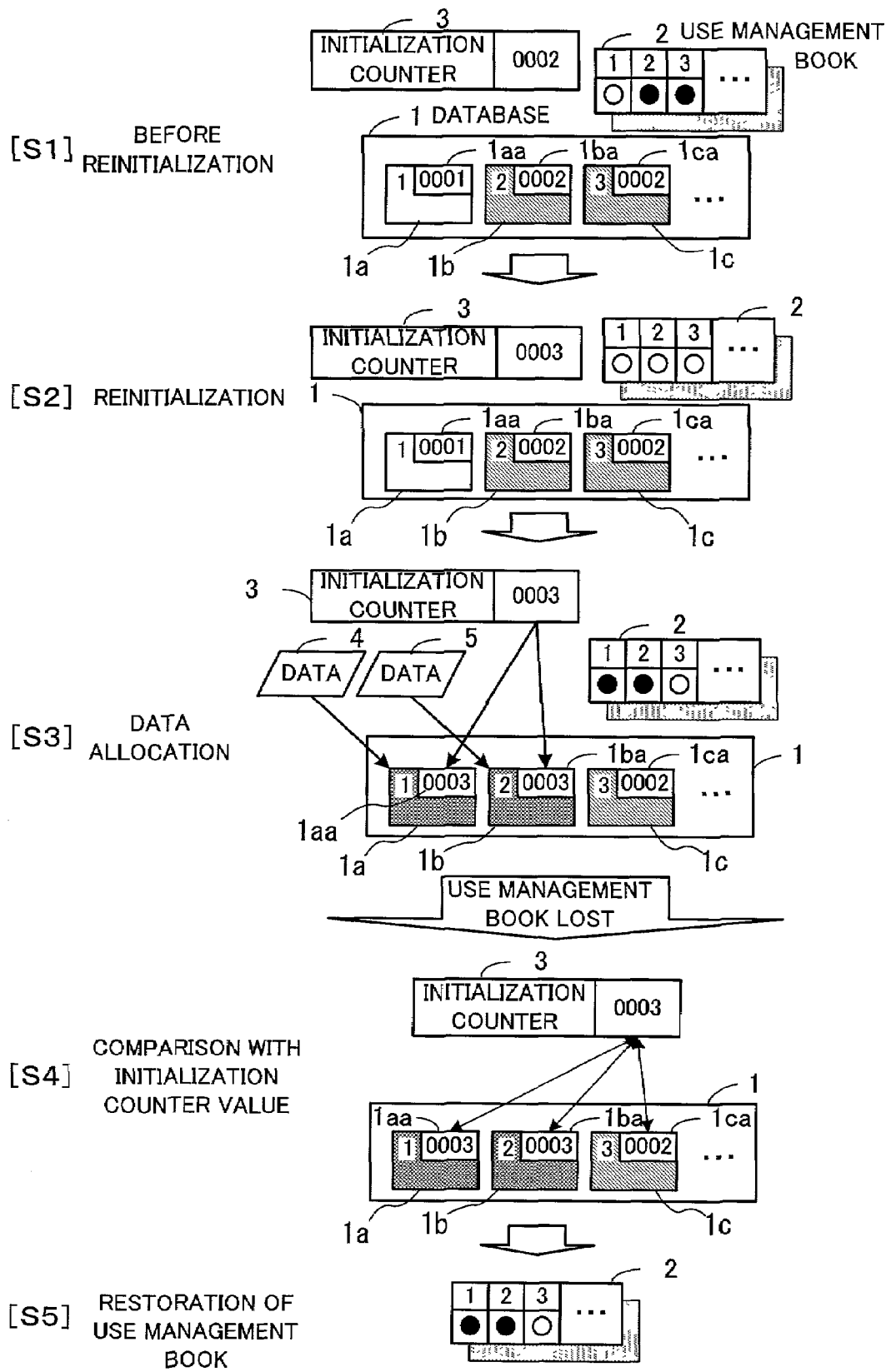
FIG. 1 is a conceptual diagram illustrating the invention applied to embodiments.

FIG. 1 is a conceptual diagram illustrating the invention applied to the embodiments. A computer for executing a database management program according to the present invention functions as a database server.

[S1] Before reinitialization, the database server has a database 1, a use management book 2, and an initialization counter 3. The database 1 stores data in respective unit storage regions $1a$, $1b$, $1c$, . . . . The unit storage regions $1a$, $1b$, $1c$, . . . are each a storage unit called page, for example. In the unit storage regions $1a$, $1b$, $1c$, . . . , allocation-timed counter values $1aa$, $1ba$, $1ca$, . . . are respectively set. In the use management book 2 are set allocation flags which indicate the allocation/non-allocation of data to the respective unit storage regions. The initialization counter 3 has a value set therein which indicates the number of times the database 1 has been initialized.

[S2] When the database 1 is reinitialized, the database server sets all of the allocation flags, which are provided in the use management book 2 and indicative of the allocation/non-allocation of data to the respective unit storage regions, to a non-allocated state. Also, at the time of reinitialization, the database server updates the value of the initialization counter 3.

[S3] Each time data (e.g., data 4, 5) is allocated to a unit storage region (e.g., region $1a$, $1b$) in the database 1, the database server sets the allocation flag in the use management book 2 corresponding to the unit storage region ($1a$, $1b$) to which the data (4, 5) has been allocated, to an allocated state. Also, the database server sets the value of the initialization counter 3 as the allocation-timed counter value $1aa$, $1ba$ associated with the unit storage region $1a$, $1b$.

[S4] In the event the use management book 2 is lost because of destruction of the content thereof, the database server compares each of the allocation-timed counter values $1aa$, $1ba$, $1ca$, . . . , set in the respective unit storage regions $1a$, $1b$, $1c$, . . . in the database 1, with the value of the initialization counter 3.

[S5] The database server sets the allocation flags associated with those unit storage regions whose allocation-timed counter values coincided with the initialization counter value as a result of comparison, to an allocated state, and also sets the allocation flags associated with those unit storage regions whose allocation-timed counter values did not coincide with the initialization counter value, to a non-allocated state, thereby restoring the use management book 2.

Thus, the use management book 2 can be restored without the need to perform physical initialization at the time of reinitialization. The initialization of the use management book 2 carried out in the reinitialization process involves only the initialization of the allocation flags, and thus can be completed in a very short period of time, compared with physical initialization. Consequently, even in the case where the scale of the database is enlarged, the time required for the reinitialization process remains almost the same, so that the database initialization time is practically shortened, improving the efficiency of use of the database.

Further, in the case of a system using a plurality of databases while cyclically switching the same, it is possible to prevent unnecessary increase in capacity of the databases that arises from prolonged reinitialization time.

An embodiment of the present invention will be now described in detail, taking a database server capable of accumulating operator's operation history as an example.

Figure 2:
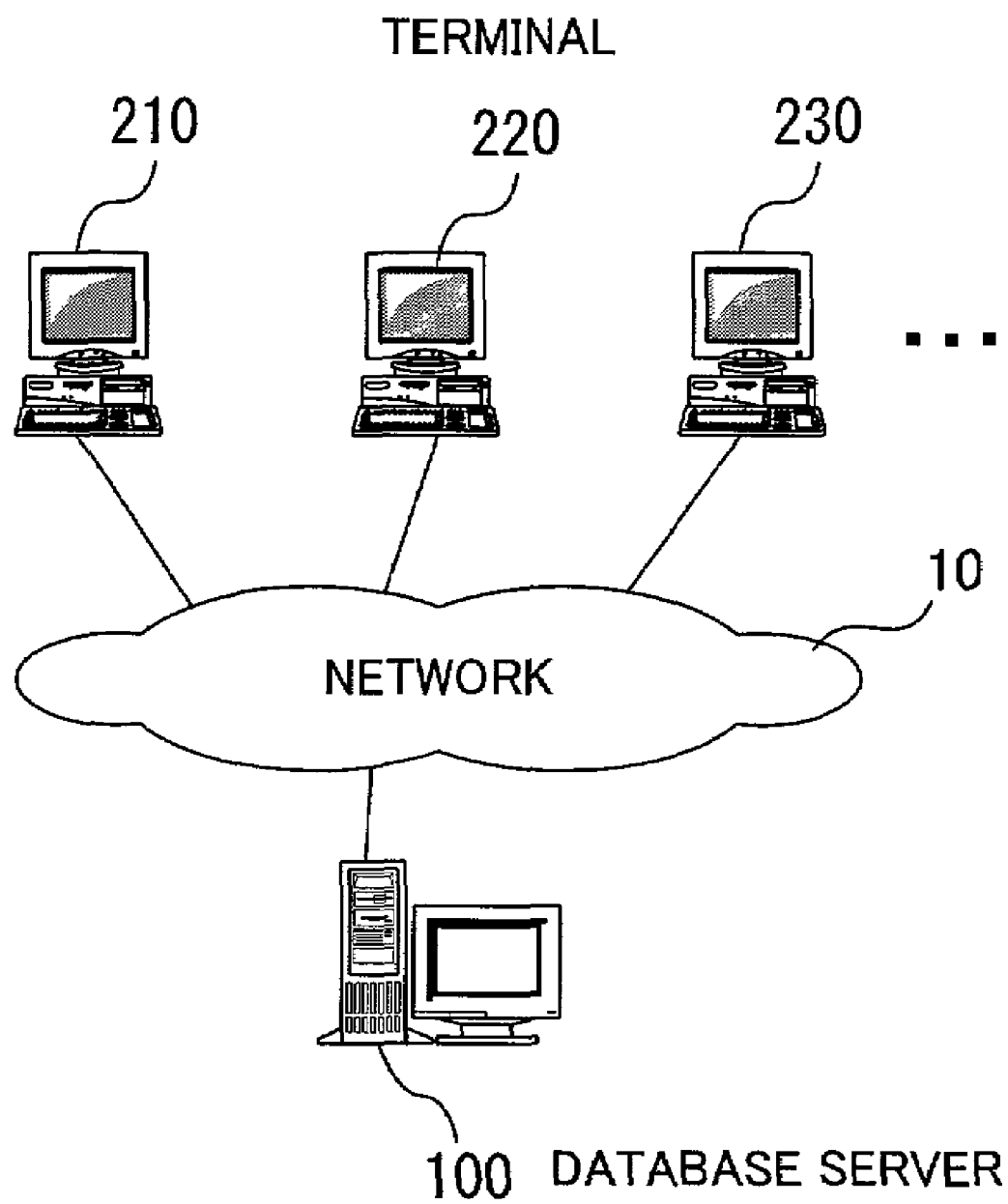
FIG. 2 is a diagram showing an exemplary configuration of a database system.

FIG. 2 shows an exemplary configuration of a database system. The database system comprises a database server 100 and a plurality of terminals 210, 220, 230, . . . . The database server 100 and the individual terminals 210, 220, 230, . . . are connected via a network 10.

The terminals 210, 220, 230, . . . each transmit the content of operator's operation to the database server 100 through the network 10.

In accordance with the content of operation transmitted from the individual terminals 210, 220, 230, . . . , the database server 100 creates information (operation history information) indicating the operation content. The database server 100 then sequentially accumulates the created operation history information in a database thereof.

Figure 3:
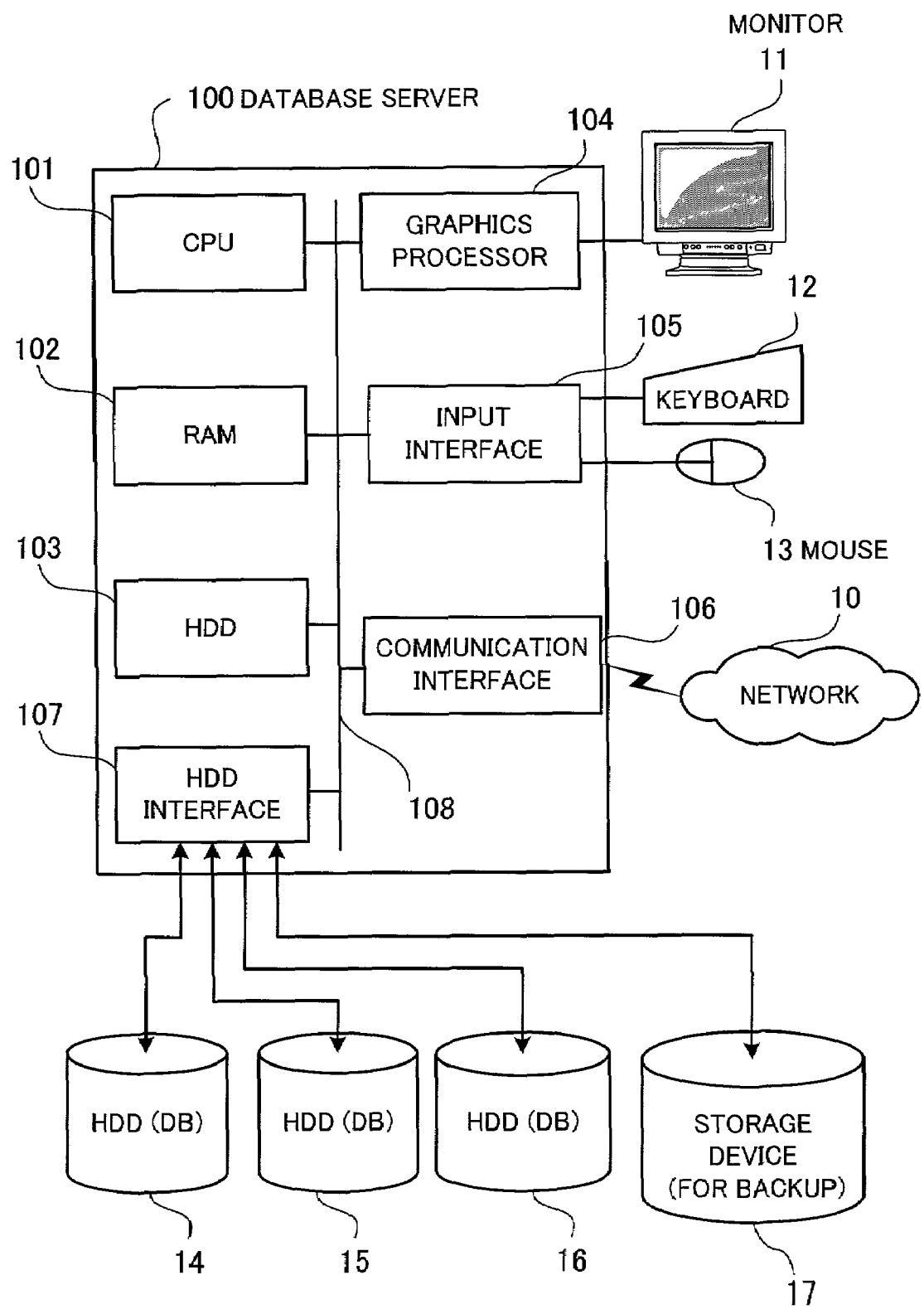
FIG. 3 is a diagram showing an exemplary hardware configuration of a database server used in an embodiment.

FIG. 3 shows an exemplary hardware configuration of the database server used in this embodiment. The database server 100 as a whole is under the control of a CPU (Central Processing Unit) 101. The CPU 101 is connected via a bus 108 with a RAM (Random Access Memory) 102, a hard disc drive (HDD) 103, a graphics processor 104, an input interface 105, a communication interface 106, and an HDD interface 107.

The RAM 102 temporarily stores OS (Operating System) programs executed by the CPU 101 and at least part of application programs. The RAM 102 also stores various data necessary for the processing by the CPU 101. The HDD 103 stores the OS and application programs.

The graphics processor 104 is connected to a monitor 11. In accordance with instructions from the CPU 101, the graphics processor 104 displays images on the screen of the monitor 11. The input interface 105 is connected to a keyboard 12 and a mouse 13. The input interface 105 sends signals supplied from the keyboard 12 and the mouse 13 to the CPU 101 via the bus 108.

The communication interface 106 is connected to the network 10. The communication interface 106 transmits and receives data to and from other computers via the network 10.

The HDD interface 107 is connected to a plurality of HDDs 14 to 16, each serving as a database (DB), and a backup storage device 17. In accordance with instructions from the CPU 101, the HDD interface 107 stores the operation history information in the DB HDDs 14 to 16. Also, in accordance with instructions from the CPU 101, the HDD interface 107 transfers the operation history information stored in the HDDs 14 to 16 to the backup storage device 17. The backup storage device 17 is, for example, a device capable of storing data in a portable recording medium, such as a magnetic tape drive.

With the hardware configuration described above, the processing function of the database server 100 of this embodiment is performed.

Figure 4:
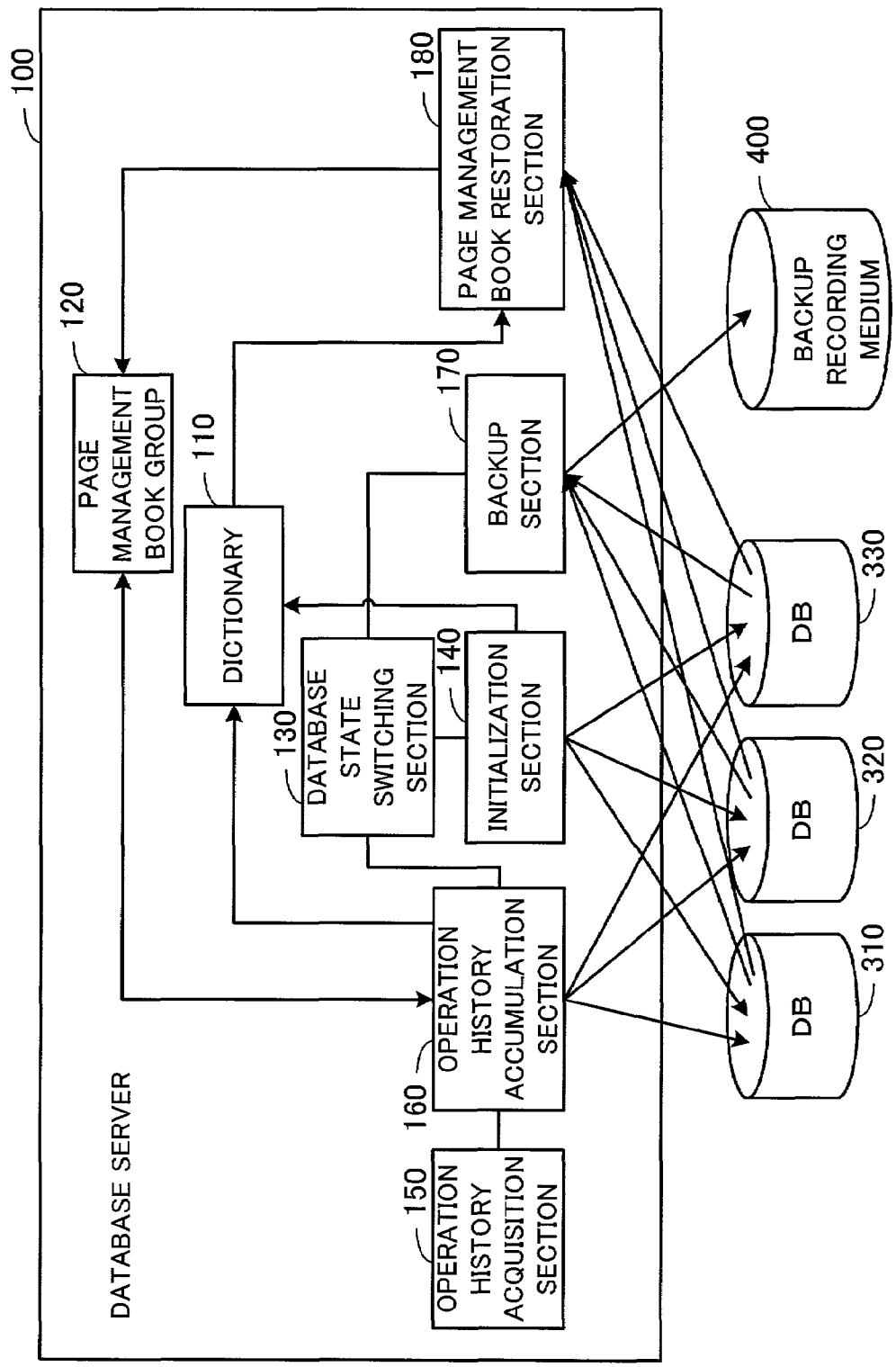
FIG. 4 is a functional block diagram of the database server.

FIG. 4 is a functional block diagram of the database server. The database server 100 is accessibly connected with a plurality of DBs 310, 320 and 330 and a backup recording medium 400. The DB 310 corresponds to a storage area in the HDD 14. The DB 320 corresponds to a storage area in the HDD 15, and the DB 330 corresponds to a storage area in the HDD 16. The backup recording medium 400 corresponds to a portable recording medium inserted in the storage device 17.

The database server 100 has a dictionary 110, a page management book group 120, a database state switching section 130, an initialization section 140, an operation history acquisition section 150, an operation history accumulation section 160, a backup section 170, and a page management book restoration section 180.

The dictionary 110 manages definition information (record information, column information, etc.) and status of use (data accumulation status or backup status) of the databases 310, 320 and 330, as well as initialization states and initialization counters. The initialization state holds information indicating whether the corresponding database is in a state before physical initialization (directly after the definition of data structure), a state directly after initialization, or a state directly after the storage of operation history information. The initialization counter holds information indicating the number of times the corresponding database 310, 320, 330 has been initialized. The initialization counter is set to "0000" when initialization (physical initialization) is performed for the first time, and is incremented by "1" each time reinitialization is performed thereafter.

The page management book group 120 manages the status of use of individual pages (unit data storage regions) of the databases 310, 320 and 330. Specifically, the page management book group 120 has flags (allocation flags) set therein which indicate whether or not the operation history information has been allocated to the respective pages in a database which is accumulating the operation history information.

The database state switching section 130 controls the switching of the states in which the databases 310, 320 and 330 are used. Specifically, the database state switching section 130 cyclically switches the state of use of the individual databases 310, 320 and 330 among three states, that is, operation history information accumulation, backup, and initialization.

More specifically, the database state switching section 130 first defines the structure of the databases 310, 320 and 330, and then sets, in the dictionary 110, information indicating that the individual databases 310, 320 and 330 are in a state directly after the definition of data structure. The database state directly after the definition of data structure represents a state in which allocation regions are pointed to from the dictionary 110 and internal data is not initialized. Then, in order that the individual databases may repeat the processes in predetermined order, the database state switching section 130 appropriately selects a database which is to be initialized, a database which is to accumulate the operation history information, and a database which is to be backed up.

Subsequently, the database state switching section 130 sends an initialization request including information identifying the database to the initialized, to the initialization section 140. Also, the database state switching section 130 sends an operation history accumulation request including information identifying the database which is to accumulate the operation history information, to the operation history accumulation section 160. Further, the database state switching section 130 sends a backup request including information identifying the database to be backed up, to the backup section 170.

On receiving the initialization request from the database state switching section 130, the initialization section 140 initializes the database specified by the initialization request. The initialization process includes physical initialization and reinitialization. In the physical initialization, the storage area of the database is subdivided in accordance with the structure definition, and meaningless data is written into the individual subdivided storage regions. The reinitialization is a process for initializing a page management book in the page management book group 120 that corresponds to the database to be initialized. Initializing the page management book means setting the allocation flags of all pages to a blank (non-allocated) state.

The operation history acquisition section 150 acquires information about the content of operator's operation transmitted from the terminals 210, 220, 230, . . . over the network 10. Subsequently, the operation history acquisition section 150 affixes predetermined management information such as time information to the acquired information, to generate operation history information, and then transfers the generated operation history information to the operation history accumulation section 160.

On receiving the operation history information accumulation request from the database state switching section 130, the operation history accumulation section 160 identifies the database specified by the operation history information accumulation request as a database which is to accumulate the operation history information. Then, the operation history accumulation section 160 stores the operation history information acquired from the operation history acquisition section 150 into the specified database.

When storing new operation history information, the operation history accumulation section 160 looks up the content of the page management book group 120 to check for blank pages in the database. The operation history accumulation section 160 then stores the operation history information into a blank page. After storing the operation history information in the blank page, the operation history accumulation section 160 sets information indicative of allocated state to that allocation flag in the page management book group 120 which is associated with this page.

On receiving the backup request from the database state switching section 130, the backup section 170 stores backup data of the operation history information in the database specified by the backup request, into the backup recording medium 400. The backup data may be an exact copy of the operation history information or a single compressed data file.

Upon receipt of a page management book restoration request entered, for example, in response to an operation by the administrator of the database server 100, the page management book restoration section 180 looks up the contents of the dictionary 110 and the databases 310, 320 and 330 to create the page management book group 120. The page management book restoration request is entered when the content of the page management book group 120 has been destroyed.

Specifically, the page management book restoration section 180 compares the values of the initialization counters set in the dictionary 110 in association with the respective databases 310, 320 and 330 with the allocation-timed counter values of the individual pages in the respective databases 310, 320 and 330. In accordance with the comparison results, the page management book restoration section 180 judges those pages whose allocation-timed counter values coincided with the value of the initialization counter as data-allocated pages (pages including valid data). Also, the page management book restoration section 180 judges those pages whose allocation-timed counter values did not coincide with the value of the initialization counter as blank pages (pages including invalid data). Then, in accordance with the use/nonuse of the individual pages of the databases, the page management book restoration section 180 creates the page management book group 120.

Figure 5:
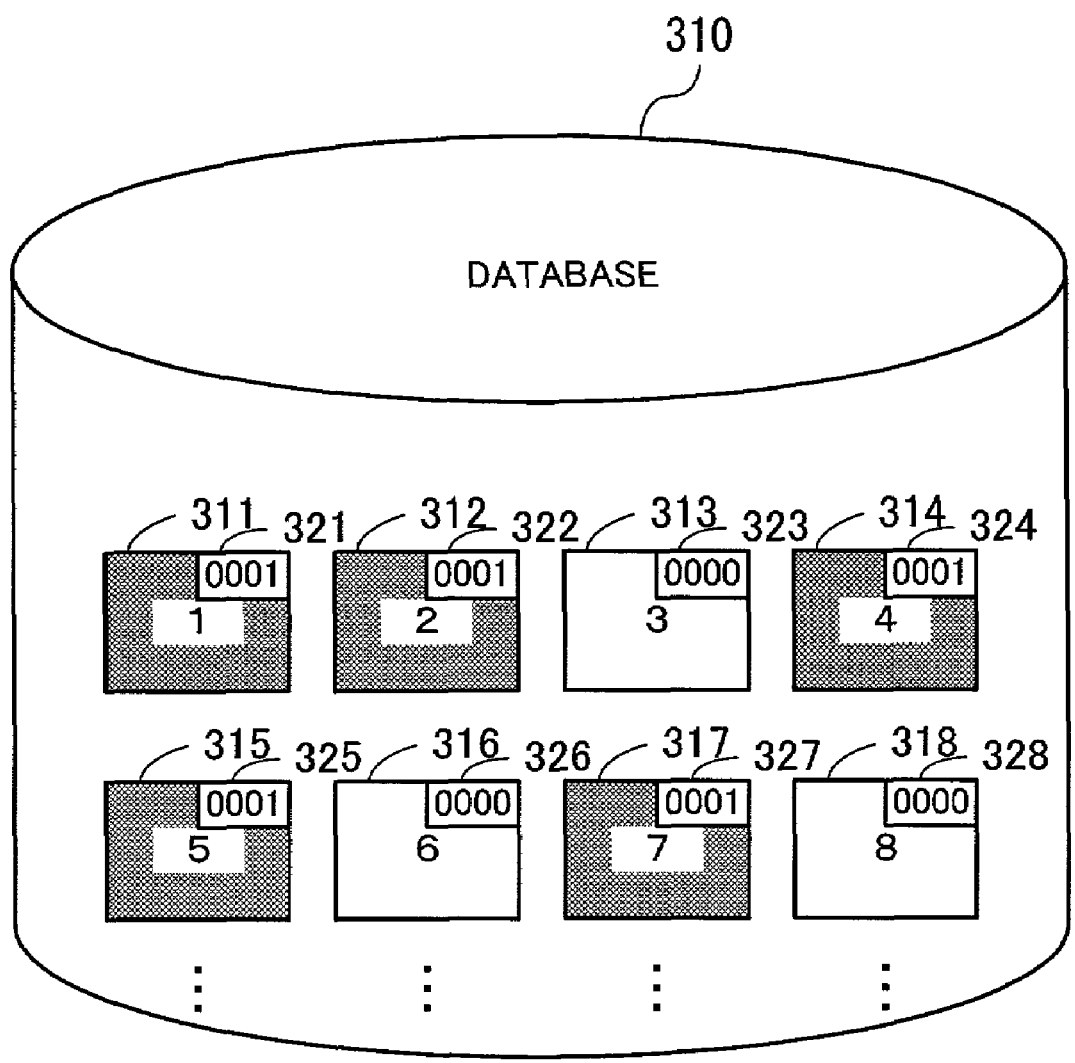
FIG. 5 is a diagram showing an exemplary data structure of a database.

FIG. 5 shows an exemplary data structure of the database. The database 310 stores the operation history information in respective pages 311 to 318, . . . . The pages 311 to 318, . . . have respective identification numbers (page numbers) set therein and also include allocation-timed counter values 321 to 328, . . . , respectively. As the allocation-timed counter values 321 to 328, . . . , the value of the initialization counter associated with the database 310 is set when the operation history information is allocated to the respective pages.

The example of FIG. 5 shows a state of accumulation of the operation history information after the database 310 was initialized twice. In FIG. 5, those pages in which the operation history information has been recorded after the last (second) initialization are indicated by shading. The operation history information has been stored in the pages 311, 312, 314, 315 and 317 with the page numbers "1", "2", "4", "5" and "7" after the last initialization.

The value "0001", which indicates that the initialization has been performed twice, is set as the allocation-timed counter values 321, 322, 324, 325 and 327 of the pages 311, 312, 314, 315 and 317 in which the operation history information has been stored after the last initialization. On the other hand, the value "0000", which indicates that the initialization has been performed once, is set as the allocation-timed counter values 323, 326 and 328 of the pages 313, 316 and 318 which have no operation history information stored therein after the last initialization.

FIG. 6 shows an exemplary data structure of the dictionary. The dictionary 110 is provided with columns named database (DB) number, initialization state and initialization counter. The items of information along each row across the columns indicate interrelated information.

In the database number column are set identification numbers (database numbers) of the respective databases 310, 320 and 330. The database number of the database 310 is "DB#1", the database number of the database 320 is "DB#2", and the database number of the database 330 is "DB#3".

In the state column, initialization states of the respective databases 310, 320 and 330 are set. For an initialization state before the physical initialization (directly after the data structure definition), "NON" is set in a corresponding field of the state column. For an initialization state after the initialization (before the storage of operation history information), "INT" is set in a corresponding field of the state column, and for an initialization state after the storage of operation history information (before reinitialization), "ACT" is set in a corresponding field of the state column.

In the initialization counter column are set numerical values (initialization counters) indicating the number of times the respective databases have been initialized. The value of the initialization counter is set to "0000" when the physical initialization has been performed, and is incremented by "1" thereafter each time reinitialization is performed.

The example of FIG. 6 indicates that the database 310 with the database number "DB#1" is in a state directly after the storage of operation history information, and that the physical initialization has been performed once. The database 320 with the database number "DB#2" is in a state directly after the initialization, and the physical initialization has been performed once. The database 330 with the database number "DB#3" is in a state directly after the data structure definition, and no initialization has been performed yet.

Figure 7:
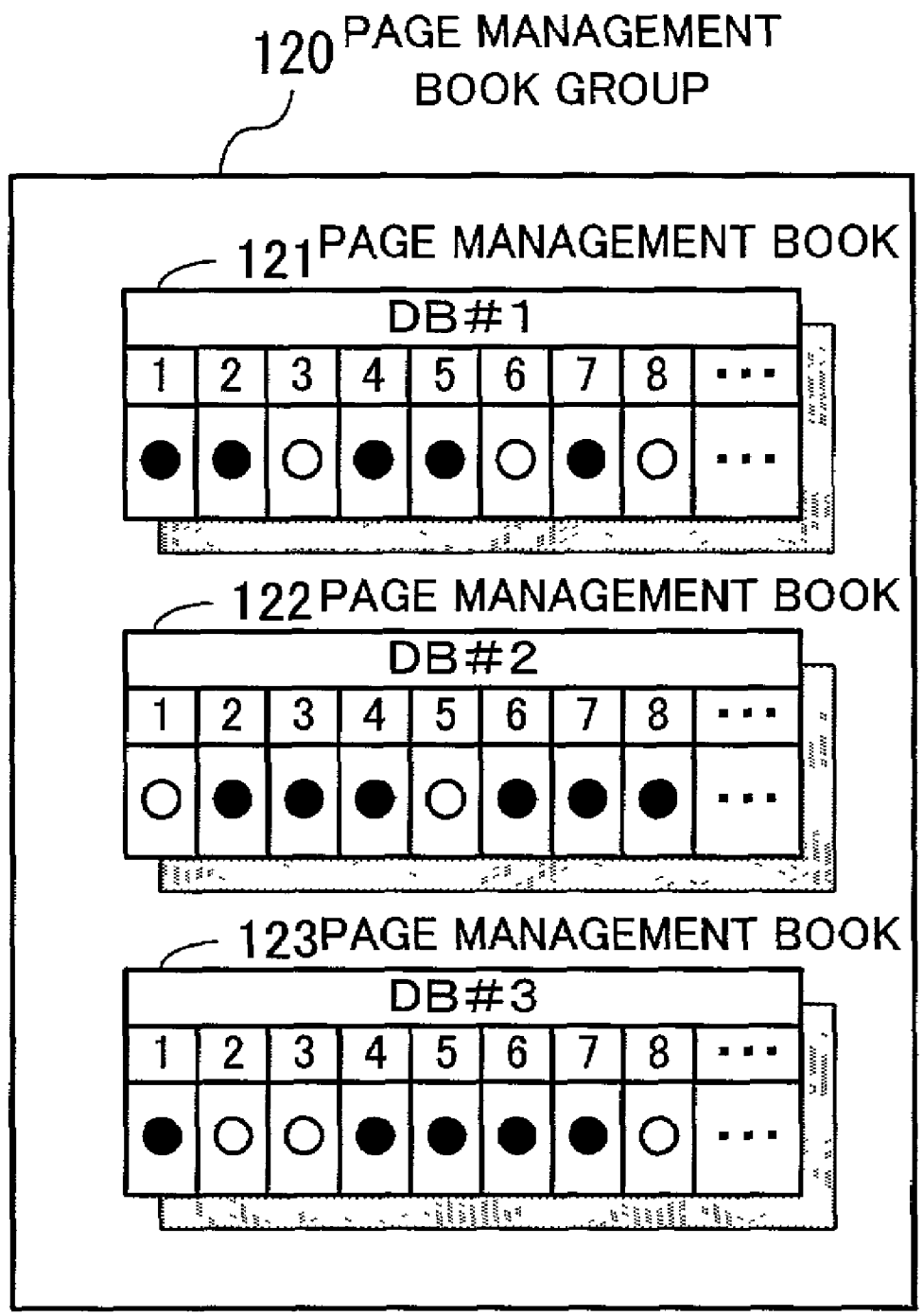
FIG. 7 is a diagram showing an exemplary data structure of page management books.

FIG. 7 shows an exemplary data structure of the page management book group. The page management book group 120 includes page management books 121 to 123 corresponding to the respective databases 310, 320 and 330. The page management book 121 is associated with the database 310 with the database number "DB#1", the page management book 122 is associated with the database 320 with the database number "DB#2", and the page management book 123 is associated with the database 330 with the database number "DB#3".

The page management books 121 to 123 each have flags (allocation flags) set therein in association with the page numbers of the respective pages of the corresponding databases 310, 320 and 330 to indicate the use/nonuse of the respective pages. In the example of FIG. 7, information indicative of allocated state is indicated by the dark circle (●), and information indicative of blank state is indicated by the circle (○). In practice, the allocated state-indicative information is represented by "11", for example, while the blank state-indicative information is represented by "00", for example.

The page management book 121 associated with the database 310 with the database number "DB#1", for example, shows that information has been allocated to the pages with the page numbers #1, #2, #4, #5 and #7, and that the pages with the page numbers #3, #6 and #8 are blank.

The operation history information is accumulated by means of the database server 100 having the aforementioned configuration and data structures.

Processes executed by the database server 100 will be now described in detail. First, a process for switching the states of the databases 310, 320 and 330 will be explained.

Figure 8:
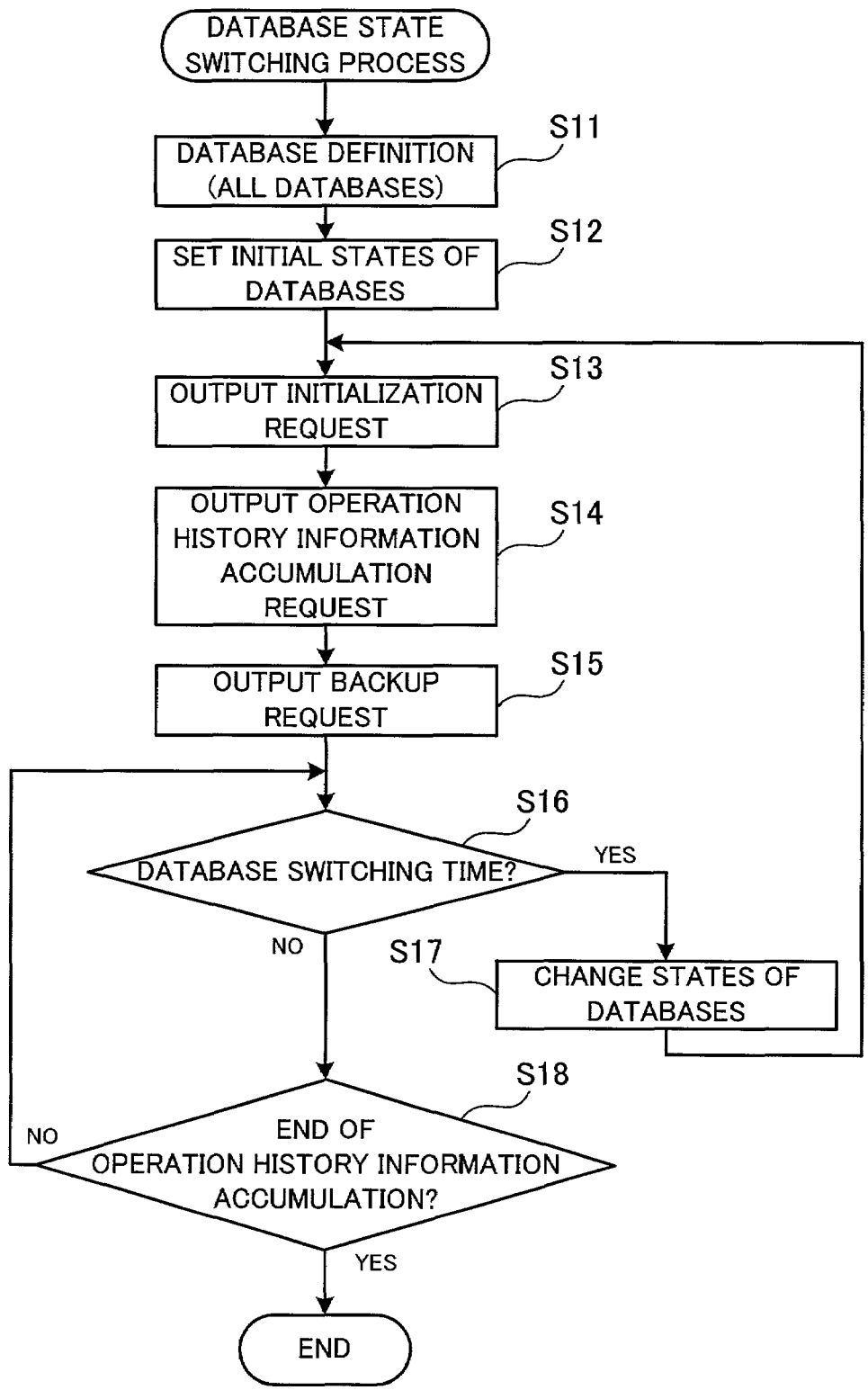
FIG. 8 is a flowchart showing a procedure for a database state switching process.

FIG. 8 is a flowchart showing a procedure for the database state switching process. In the following, the process shown in FIG. 8 will be explained in order of the step number. Meanwhile, the operation history information accumulation process is initiated after the start of the database server 100 or when an instruction to perform the function of accumulating the operation history information is entered in response to the operator's operation etc.

[Step S11] The database state switching section 130 defines, with respect to all databases 310, 320 and 330, a data structure for accumulating the operation history information. The content of the structure definition is transferred to the initialization section 140. Then, the database state switching section 130 sets information "NON", which indicates the database state directly after the structure definition, in corresponding fields of the state column in the dictionary 110 in association with the respective databases 310, 320 and 330.

[Step S12] The database state switching section 130 sets initial states for the respective databases 310, 320 and 330. Specifically, the database state switching section 130 sets a database which is to accumulate the operation history information first, as a database to be initialized.

[Step S13] The database state switching section 130 outputs an initialization request specifying the database to be initialized, to the initialization section 140.

[Step S14] The database state switching section 130 outputs an operation history information accumulation request specifying the database which is to accumulate the operation history information, to the operation history accumulation section 160. In the case where the database state switching process has just been started and there is no initialized database, Step S14 is skipped.

[Step S15] The database state switching section 130 outputs a backup request specifying the database to be backed up, to the backup section 170. In the case where the database state switching process has just been started and the operation history information accumulation process is not performed yet, Step S15 is skipped.

[Step S16] The database state switching section 130 determines whether or not it is time to switch the states of the databases. The time for switching the database states may be set, for example, to a time when the initialization of the database which is to accumulate the operation history information next is completed. Alternatively, the database states may be switched at predetermined intervals of time (it is necessary, however, that the initialization of the database which is to accumulate the operation history information next should be completed).

If the database state switching time has arrived, the flow proceeds to Step S17; if not, the flow proceeds to Step S18.

[Step S17] The database state switching section 130 changes the states of the individual databases. Specifically, the database state switching section 130 sets the initialized database as a database for accumulating the operation history information, and sends an operation history information accumulation request to the operation history accumulation section 160. Also, the database state switching section 130 sets the database which has accumulated the operation history information as a database to be backed up, and sets the database which has been backed up, as a database to be initialized. The flow then proceeds to Step S13. Consequently, in Steps S13 to S16, requests to perform the respective processes according to the changed database states are output to the initialization section 140, the operation history accumulation section 160 and the backup section 170.

[Step S18] The database state switching section 130 determines whether or not the operation history information accumulation process has been ended. When an input operation indicating termination of the accumulation of the operation history information has been performed, for example, the database state switching section 130 judges that the operation history information accumulation process has been ended. If the operation history information accumulation process has been ended, the process shown in FIG. 8 is terminated; if not, the flow proceeds to Step S16.

Figure 9:
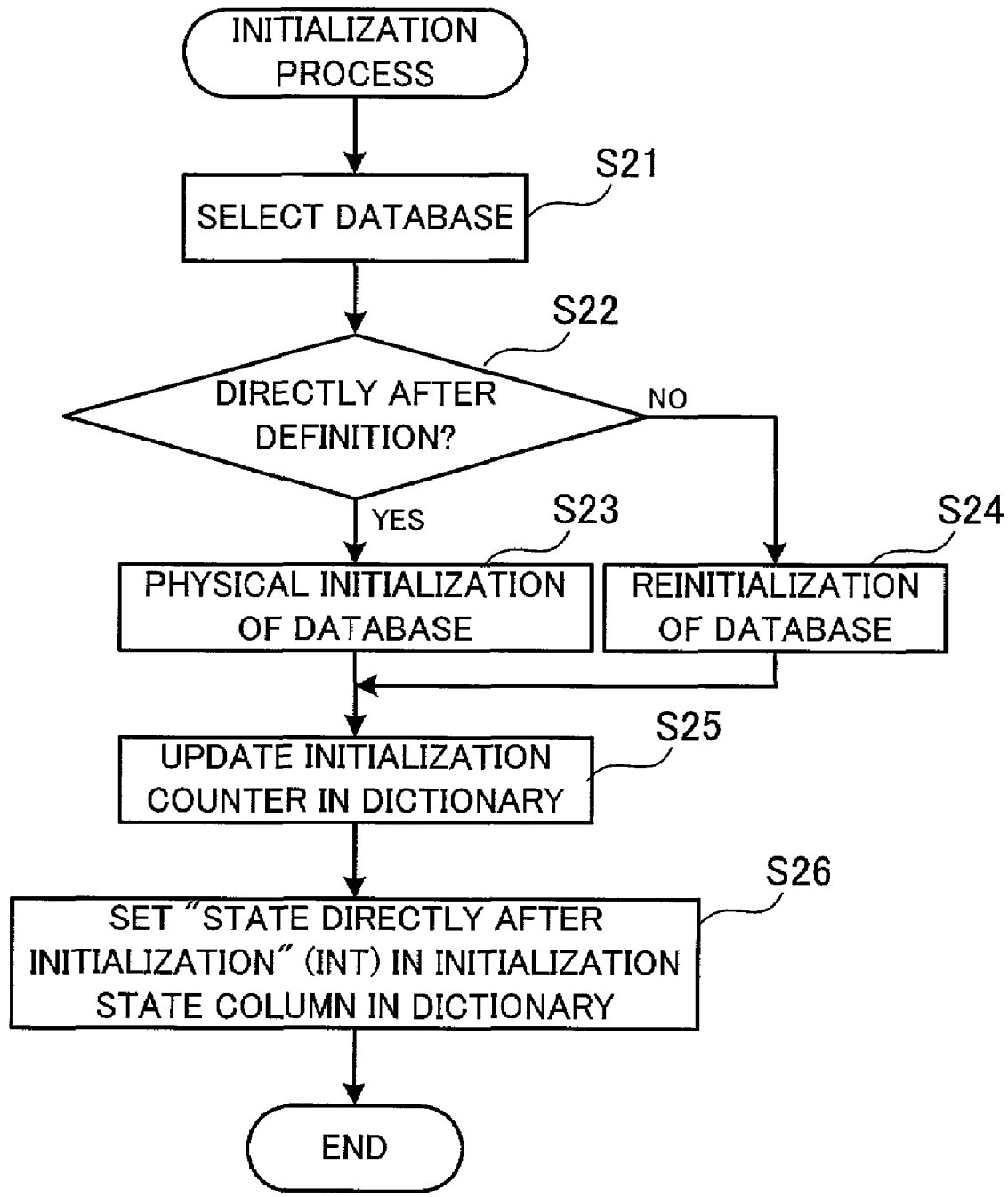
FIG. 9 is a flowchart showing a procedure for an initialization process.

FIG. 9 is a flowchart showing a procedure for the initialization process. In the following, the process shown in FIG. 9 will be explained in order of the step number. The initialization process is executed by the initialization section 140 when the initialization request specifying a database to be initialized is output from the database state switching section 130.

[Step S21] The initialization section 140 selects the database specified by the initialization request as a database to be initialized.

[Step S22] The initialization section 140 looks up the dictionary 110 to determine whether or not the selected database is in a state directly after the data structure definition (before initialization). Specifically, if "NON" is set in the dictionary 110 as the initialization state of the selected database, then it means that the selected database is in a state directly after the definition. If the initialization state shows that the database is in a state directly after the definition, the flow proceeds to Step S23; if not, the flow proceeds to Step S24.

[Step S23] The initialization section 140 physically initializes the selected database. The flow then proceeds to Step S25.

[Step S24] The initialization section 140 reinitializes the selected database.

[Step S25] The initialization section 140 updates the initialization counter in the dictionary 110 corresponding to the selected database. Specifically, if the database was physically initialized, the initialization section 140 sets "0000" in the initialization counter; if the database was reinitialized, "1" is added to the value of the initialization counter.

[Step S26] The initialization section 140 sets information (INT) indicative of the state directly after initialization in that field of the initialization state column in the dictionary 110 which corresponds to the selected database, whereupon the initialization process is ended.

Figure 10:
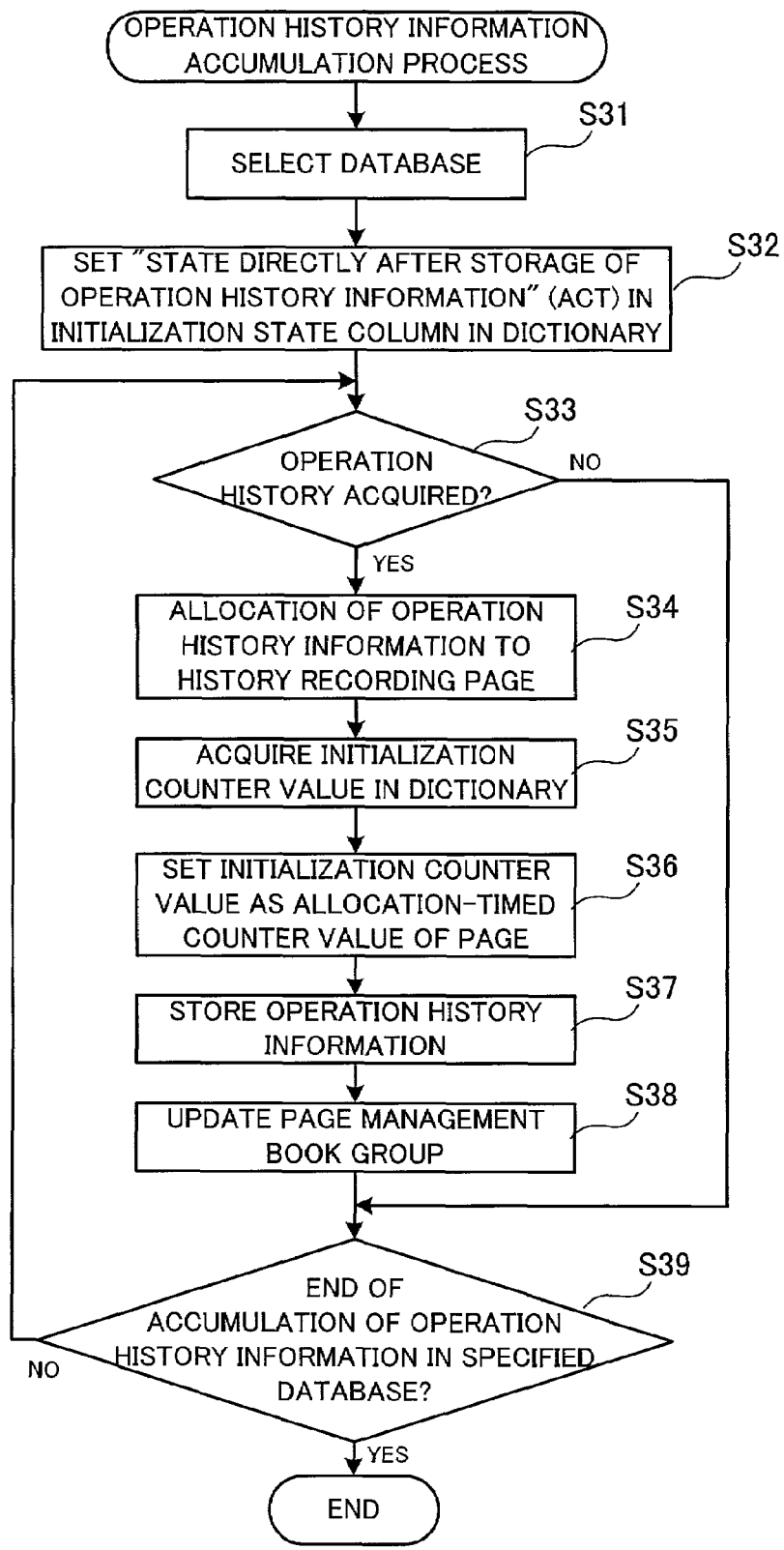
FIG. 10 is a flowchart showing a procedure for an operation history information accumulation process.

FIG. 10 is a flowchart showing a procedure for the operation history information accumulation process. In the following, the process shown in FIG. 10 will be explained in order of the step number. The operation history information accumulation process is executed by the operation history accumulation section 160 when the operation history information accumulation request specifying a database which is to accumulate the operation history information is output from the database state switching section 130.

[Step S31] The operation history accumulation section 160 selects the database specified by the operation history information accumulation request as a database for accumulating the operation history information.

[Step S32] The operation history accumulation section 160 sets information (ACT) indicative of the state directly after the storage of operation history information, in that field of the initialization state column in the dictionary 110 which corresponds to the selected database.

[Step S33] The operation history accumulation section 160 determines whether or not operation history information has been acquired from the operation history acquisition section 150. If operation history information has been acquired, the flow proceeds to Step S34; if not, the flow proceeds to Step S39.

[Step S34] The operation history accumulation section 160 looks up the page management book group 120 to check for the page numbers of blank pages in the selected database. Then, the operation history accumulation section 160 selects one of the blank pages as a history recording page and allocates thereto the acquired operation history information.

[Step S35] The operation history accumulation section 160 acquires the value of the initialization counter in the dictionary 110 corresponding to the selected database.

[Step S36] The operation history accumulation section 160 sets the value of the initialization counter acquired from the dictionary 110, as the allocation-timed counter value for the history recording page.

[Step S37] The operation history accumulation section 160 stores the operation history information acquired from the operation history acquisition section 150 in the history recording page.

[Step S38] The operation history accumulation section 160 updates the page management book group 120. Specifically, the operation history accumulation section 160 sets the allocation flag in the page management book group 120 corresponding to the history recording page to an allocated state.

[Step S39] The operation history accumulation section 160 determines whether or not the accumulation of operation history information in the specified database is to be ended. The accumulation of operation history information in the specified database is ended, for example, when the database states have been switched so that a different database is set as a database for accumulating the operation history information, or when an input operation indicating termination of the operation history information accumulation process has been performed.

If the accumulation of operation history information in the specified database should be ended, the process shown in FIG. 10 is terminated; if not, the flow proceeds to Step S33.

The processes described above are executed by the database server 100, whereby the operation history information is accumulated in the multiple databases 310, 320 and 330 in sequence.

Figure 11:
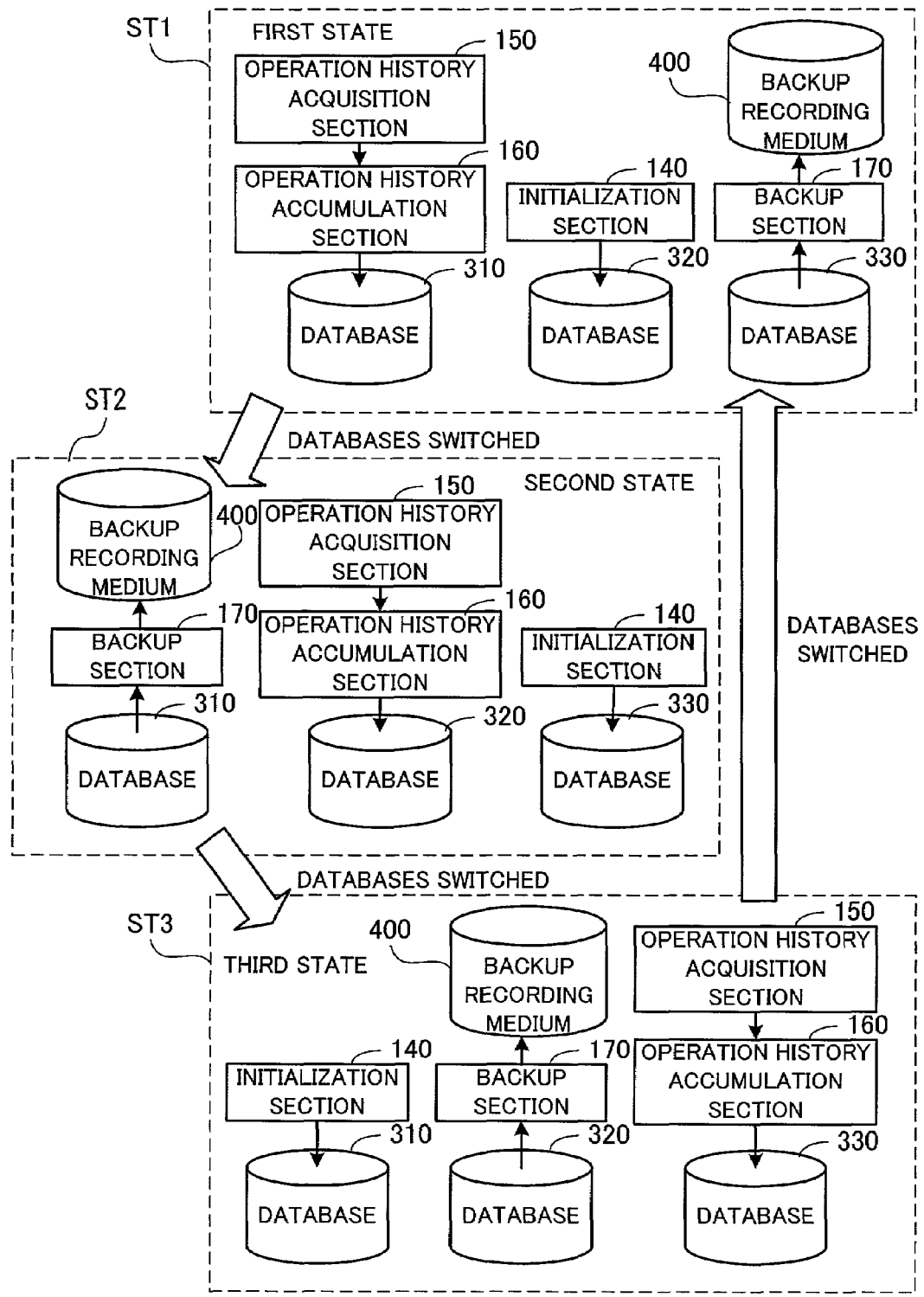
FIG. 11 is a state transition diagram showing state switching of databases.

FIG. 11 is a state transition diagram illustrating switching of the database states. In this embodiment, the operation history information accumulation process is carried out by the database server 100 while causing the individual databases to undergo the three states in order. The state switching is controlled by the database state switching section 130.

In a first state ST1, it is the database 310 that is to accumulate the operation history information, and the operation history information generated by the operation history acquisition section 150 is stored in the database 310 by the operation history accumulation section 160. The database 320, which is a database to be initialized, is initialized by the initialization section 140. The database 330 is a database to be backed up, and thus the operation history information stored in the database 330 is backed up to the backup recording medium 400 by the backup section 170.

After the processes for the respective databases 310, 320 and 330 are completed, the database states change from the first state ST1 to a second state ST2.

In the second state ST2, it is the database 320 that is to accumulate the operation history information, and the operation history information generated by the operation history acquisition section 150 is stored in the database 320 by the operation history accumulation section 160. The database 330, which is a database to be initialized, is initialized by the initialization section 140. The database 310 is a database to be backed up, and the operation history information stored in the database 310 is backed up to the backup recording medium 400 by the backup section 170.

Upon completion of the processes for the respective databases 310, 320 and 330, the database states are switched from the second state ST2 to a third state ST3.

In the third state ST3, it is the database 330 that is to accumulate the operation history information, and thus the operation history information generated by the operation history acquisition section 150 is stored in the database 330 by the operation history accumulation section 160. The database 310, which is a database to be initialized, is initialized by the initialization section 140. The database 320 is a database to be backed up, and accordingly, the operation history information stored in the database 320 is backed up to the backup recording medium 400 by the backup section 170.

After the processes for the respective databases 310, 320 and 330 are completed, the database states change from the third state ST3 to the first state ST1.

In this manner, the first state ST1, the second state ST2 and the third state ST3 are cyclically repeated, whereby the individual databases 310, 320 and 330 can be made to repeatedly execute the operation history information accumulation process, the backup process, and the initialization process. Further, one database can always be made ready for the accumulation of operation history information, so that the operation history information can be continuously accumulated.

Figure 12:
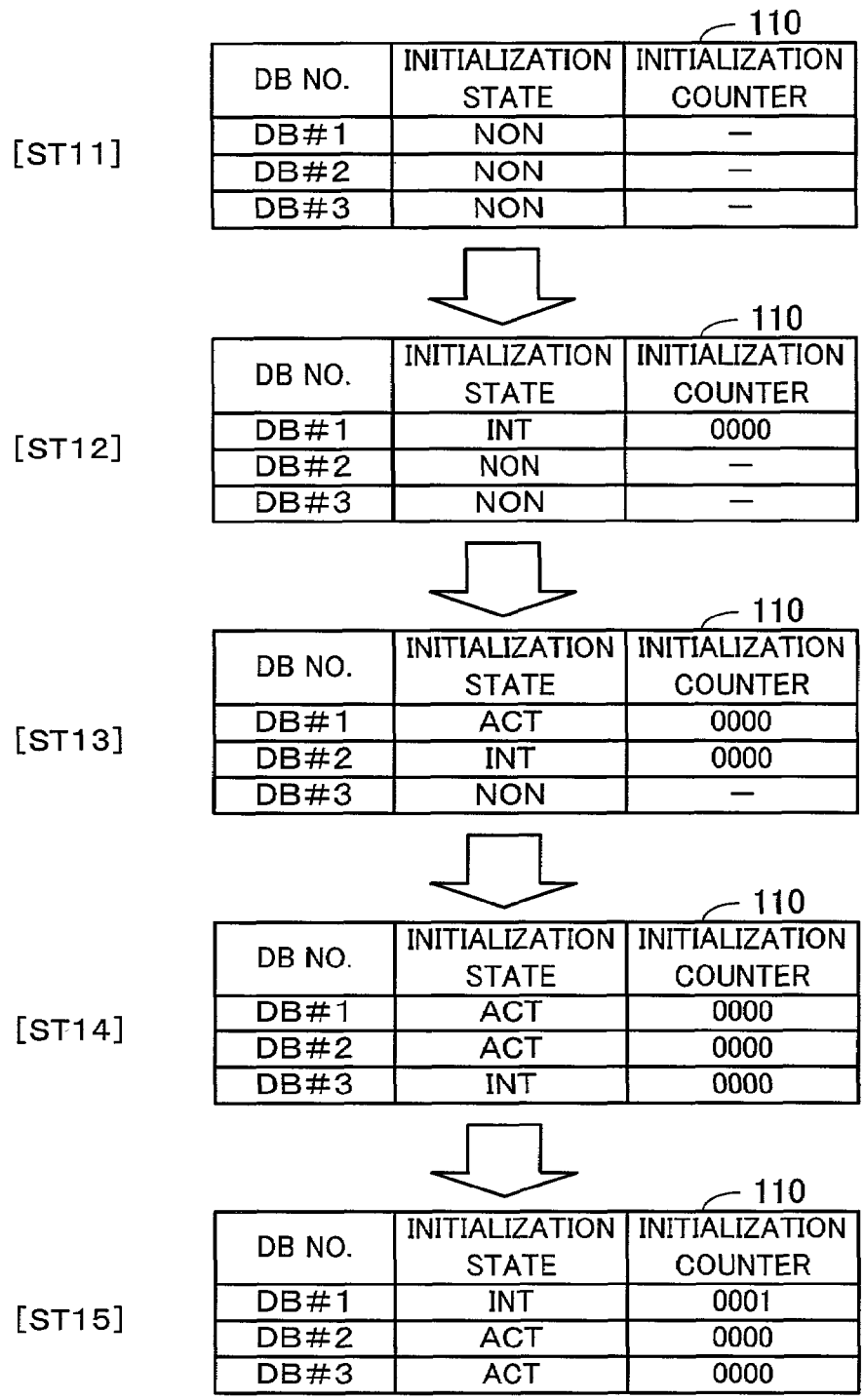
FIG. 12 is a diagram showing state transition of the dictionary.

FIG. 12 illustrates state transition of the dictionary. Each time a transition of the states of the databases 310, 320 and 330 takes place and the databases 310, 320 and 330 are initialized one after another, the corresponding fields of the initialization state column in the dictionary 110 are updated. Also, each time the database 310, 320 or 330 is initialized, the corresponding initialization counter of the initialization counter column is updated.

Directly after the definition of data structure, "NON", which indicates the state directly after the definition, is set as the initialization state of the individual databases (ST11).

When the database 310 with the database number "DB#1" is initialized, "INT", which indicates the state directly after the initialization, is set as the initialization state of the database 310, and "0000" is set as the value of the corresponding initialization counter (ST12).

Subsequently, the operation history information is stored in the database 310 with the database number "DB#1" and the database 320 with the database number "DB#2" is initialized. Thereupon, "ACT", which indicates the state after the storage of operation history information, is set as the initialization state of the database 310, "INT", which indicates the state directly after the initialization, is set as the initialization state of the database 320, and "0000" is set as the value of the corresponding initialization counter (ST13).

Then, the operation history information is stored in the database 320 with the database number "DB#2" and the database 330 with the database number "DB#3" is initialized, whereupon "ACT", which indicates the state after the storage of operation history information, is set as the initialization state of the database 320, "INT", which indicates the state directly after the initialization, is set as the initialization state of the database 330, and "0000" is set as the value of the corresponding initialization counter (ST14).

Subsequently, the operation history information is stored in the database 330 with the database number "DB#3" and the database 310 with the database number "DB#1" is initialized, whereupon "ACT", which indicates the state after the storage of operation history information, is set as the initialization state of the database 330, "INT", which indicates the state directly after the initialization, is set as the initialization state of the database 310, and "0001" is set as the value of the corresponding initialization counter (ST15).

In this manner, each time the states of the individual databases are switched, the content of the dictionary 110 is updated. The value of each initialization counter is incremented by "1" each time the corresponding database is initialized.

In the second and subsequent initialization processes, each database is simply reinitialized. When the database is reinitialized, the content thereof remains unchanged, but the content of the page management book associated with this database is initialized.

Figure 13:
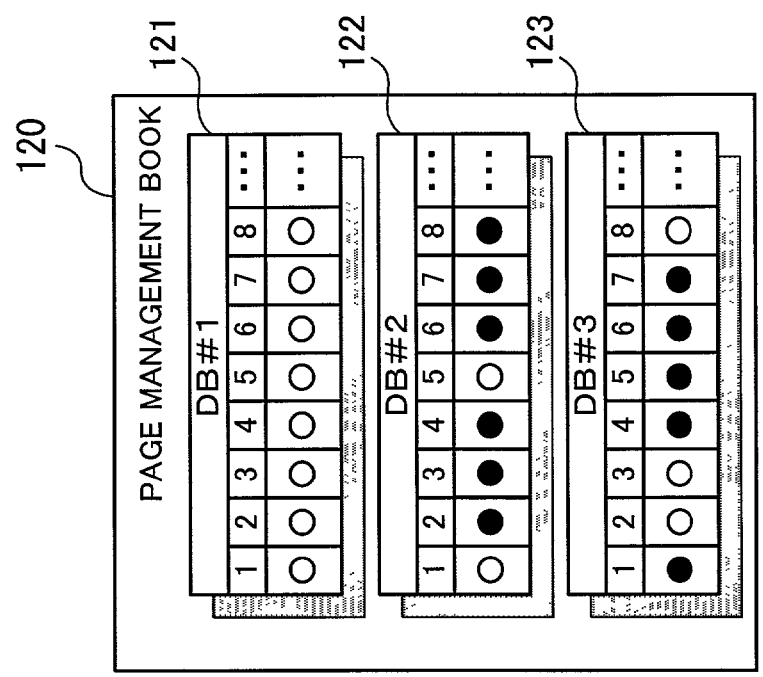
FIG. 13 is a diagram showing an example of state transition of a page management book at the time of reinitialization of a database.
Figure 13:
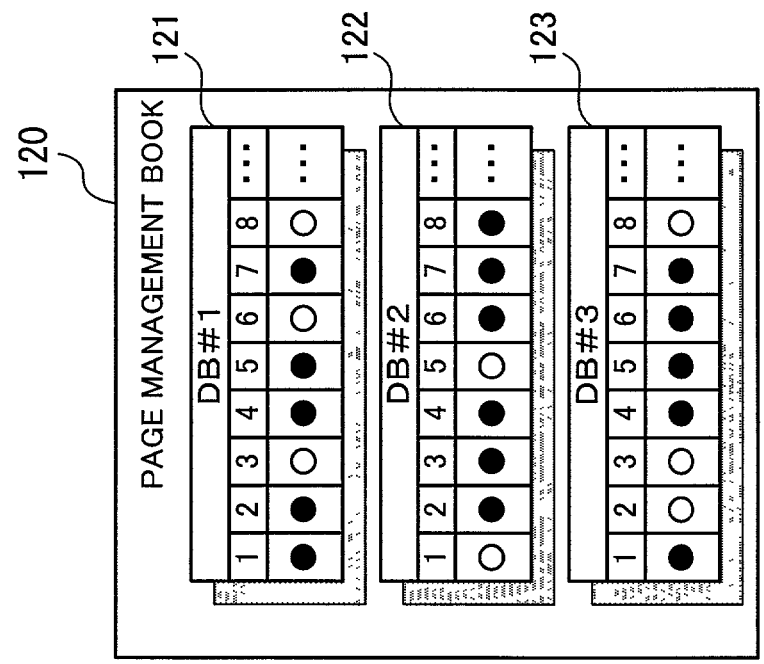

FIG. 13 illustrates an example of state transition of a page management book when the corresponding database is reinitialized. When the database 310 with the database number "DB#1", for example, is reinitialized, information (○), which indicates the blank state, is set as the individual flags in the page management book 121 corresponding to the respective pages.

Each time the operation history information is stored thereafter in a page of the database 310, information (●), which indicates the allocated state, is set as the flag corresponding to this page. At this time, the value of the initialization counter associated with the database 310 is set as the allocation-timed counter value of the page in which the operation history information has been stored.

Figure 14:
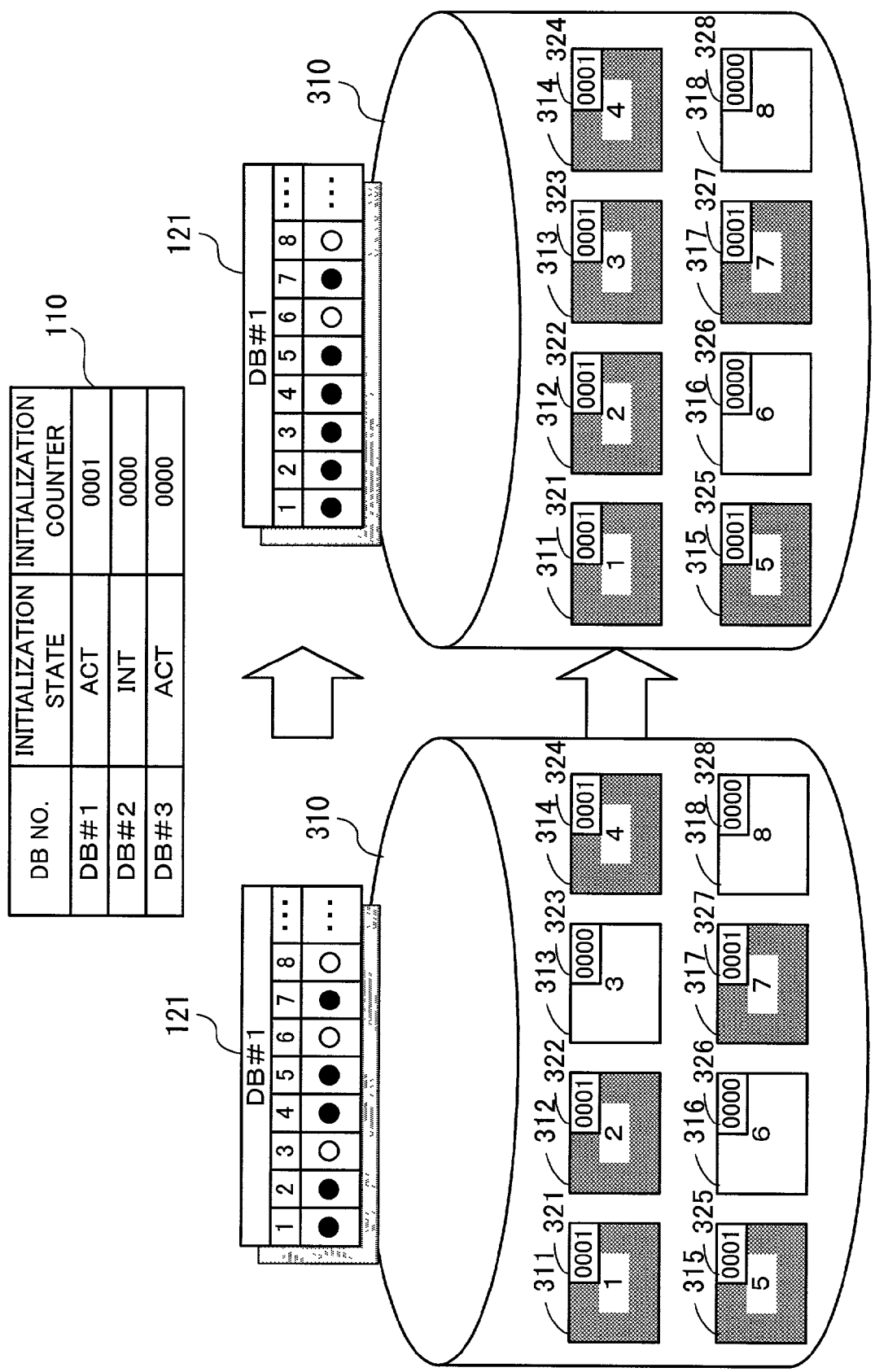
FIG. 14 is a diagram showing an example of state transition of a database when operation history information is stored.

FIG. 14 illustrates an example of state transition of a database when the operation history information is stored. In the example of FIG. 14, there are shown a state of transition of the database 310 with the database number "DB#1" when the operation history information is stored in a page 313 with the page number "#3", and a state of transition of the page management book 121 associated with the database 310. In the illustrated example, "0001" is set in that initialization counter in the dictionary 110 which is associated with the database 310. Namely, the database 310 has been initialized twice (one physical initialization and one reinitialization).

When the operation history information is allocated to and stored in the page 313, the value "0001" of the initialization counter in the dictionary 110 associated with the database 310 is set as the allocation-timed counter value 323 of this page 313. Simultaneously, information (●) indicative of the allocated state is set as the allocation flag for the page number "#3" in the page management book 121 associated with the database 310.

Thus, information indicating the number of times a corresponding one of the databases 310, 320 and 330 has been initialized is assigned to the individual pages, whereby, even in the case where the contents of the page management books 121 to 123 are destroyed, the page management books 121 to 123 can be quickly restored.

Figure 15:
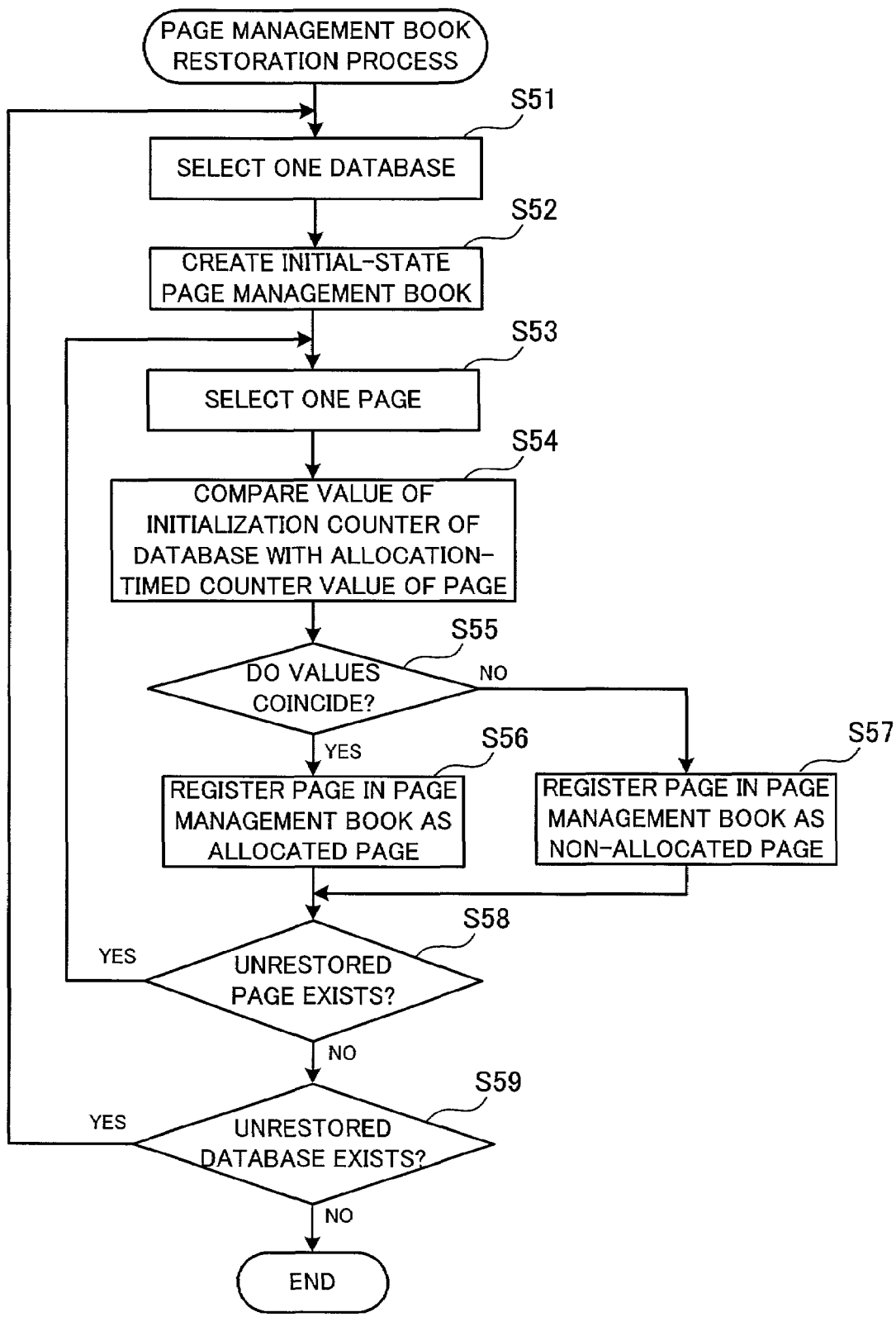
FIG. 15 is a flowchart showing a procedure for a page management book restoration process.

FIG. 15 is a flowchart showing a procedure for a page management book restoration process. In the following, the process shown in FIG. 15 will be explained in order of the step number. The process of FIG. 15 is executed by the page management book restoration section 180 when a page management book has been destroyed.

[Step S51] The page management book restoration section 180 selects one database with respect to which the page management book restoration process is not yet performed.

[Step S52] The page management book restoration section 180 creates an initial-state page management book for the selected database. In an initial state of the page management book, allocation flag-setting regions are provided in association with the respective pages of the database.

[Step S53] The page management book restoration section 180 selects one page which is not yet selected from among those in the selected database.

[Step S54] The page management book restoration section 180 compares the value of the initialization counter set in the dictionary 110 in association with the selected database with the allocation-timed counter value set in the selected page.

[Step S55] Based on the result of comparison between the value of the initialization counter and the allocation-timed counter value, the page management book restoration section 180 determines whether or not these values coincide. If the two values coincide, the flow proceeds to Step S56; if not, the flow proceeds to Step S57.

[Step S56] The page management book restoration section 180 registers information indicative of the allocated state as the allocation flag in the page management book 121 corresponding to the selected page. The flow then proceeds to Step S58.

[Step S57] The page management book restoration section 180 registers information indicative of the blank (non-allocated) state as the allocation flag in the page management book 121 corresponding to the selected page.

[Step S58] The page management book restoration section 180 determines whether or not there is some other page that has not yet undergone the restoration process. If such a page exists, the flow proceeds to Step S53; if not, the flow proceeds to Step S59.

[Step S59] The page management book restoration section 180 determines whether or not there is some other database that is not subjected to the restoration process yet. If such a database exists, the flow proceeds to Step S51; if not, the process is ended.

The page management books 121 to 123 associated with the respective databases 310, 320 and 330 can be restored in this manner.

Figure 16:
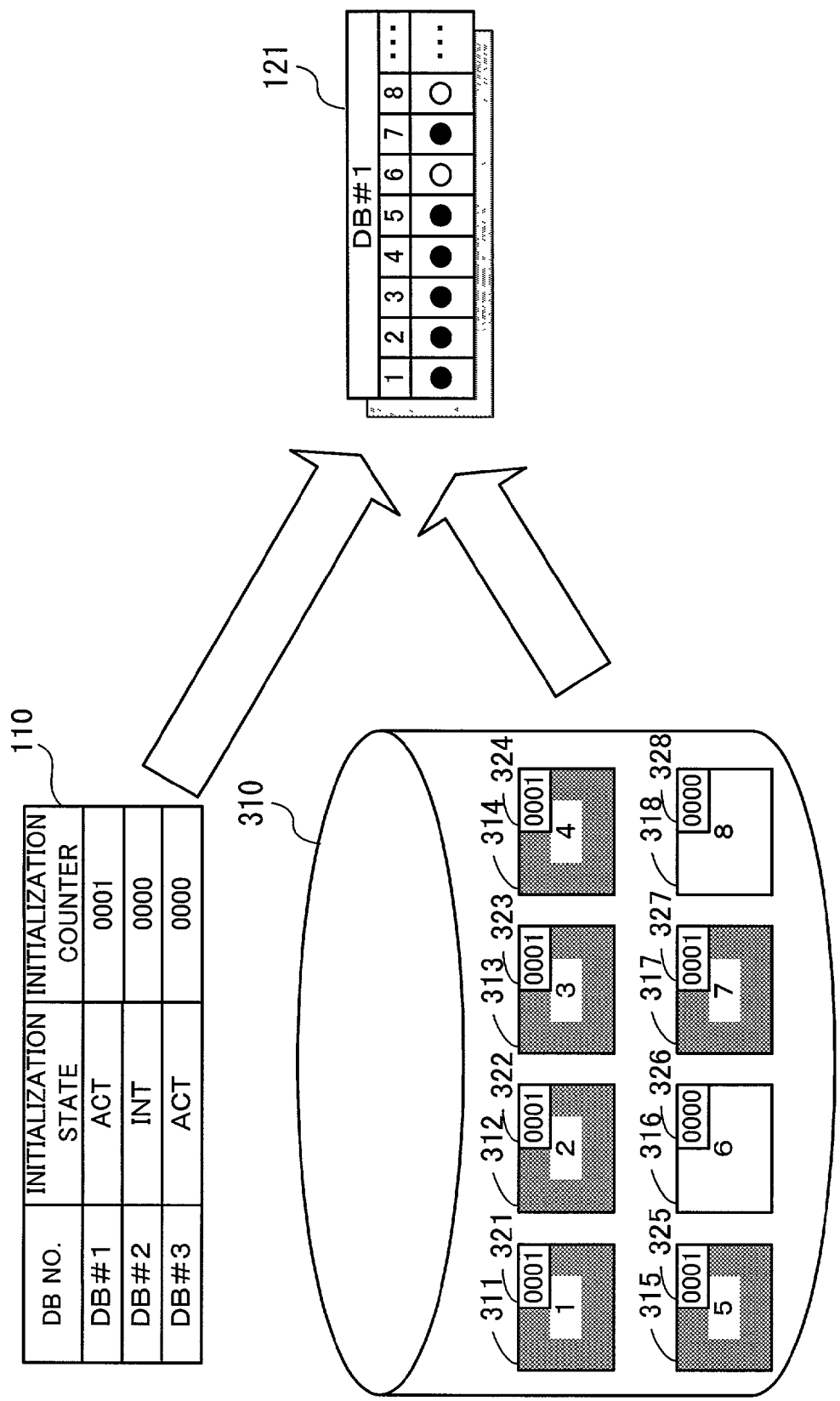
FIG. 16 is a conceptual diagram illustrating the page management book restoration process.
Figure 17:
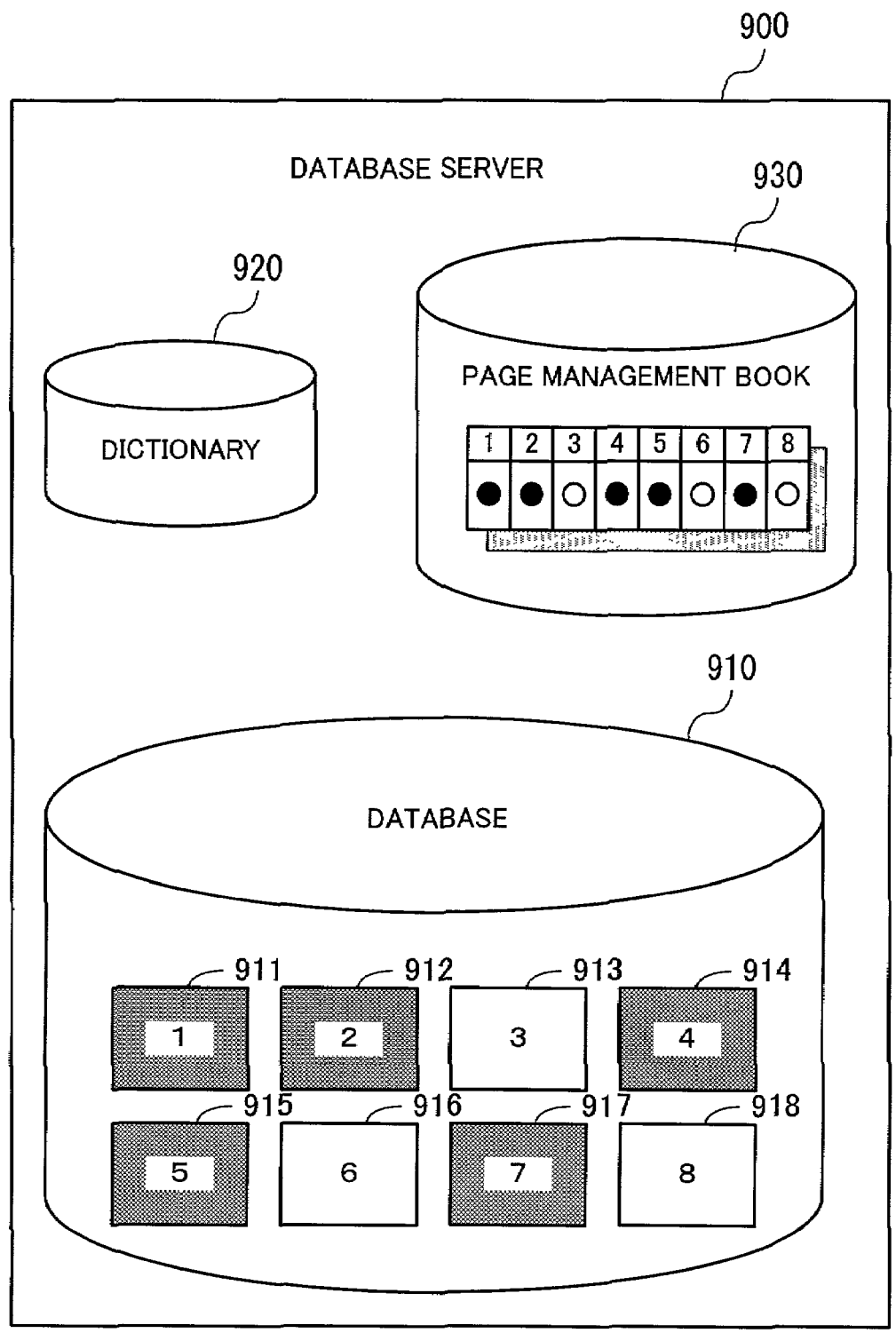
FIG. 17 is a diagram schematically showing a data structure in a conventional database server.

FIG. 16 is a conceptual diagram illustrating the page management book restoration process. In FIG. 16 is shown the process for restoring the page management book 121 associated with the database 310. In the illustrated example, the value "0001" is set in the initialization counter in the dictionary 110 corresponding to the database number "DB#1". This value "0001" of the initialization counter is compared with each of the allocation-timed counter values 321 to 328, . . . set in the respective pages 311 to 318, . . . of the database 310. If the values coincide, the page concerned is a data-allocated page, and if the values do not coincide, the page concerned is a blank page. In accordance with the result of comparison between the value of the initialization counter and each of the allocation-timed counter values, the page management book 121 is re-created. Namely, the allocation flag (●) indicative of the allocated state is set with respect to the page number of each page whose allocation-timed counter value coincided with the value of the initialization counter, and the allocation flag (○) indicative of the blank state is set with respect to the page number of each page whose allocation-timed counter value did not coincide with the value of the initialization counter.

Thus, when each page is used, information indicating the number of times the corresponding database has been initialized until then is set in the page; therefore, even in the event the page management book is destroyed, the book can be restored with ease. As a consequence, it is unnecessary to perform physical initialization when the database is to be initialized the second and subsequent times, permitting the initialization to be completed in a short time.

Further, the page management book has only allocation flags of the respective pages set therein, and accordingly, even in the case where the database is enlarged in scale, the time required to initialize the page management book at the time of reinitialization does not substantially change. In other words, the database can be initialized quickly at substantially the same speed, without being affected by the capacity of the database. This improves the operation efficiency and also makes it possible to reduce the required capacity of each database in the case of a database system which is designed to accumulate the operation history.

The processing function described above is defined as a program executable by a computer. In this case, a program is provided in which are described processes for performing the function of the database server. The program is executed by a computer, whereupon the aforementioned processing function is accomplished by the computer. The program describing the processes may be recorded on a computer-readable recording medium. The computer-readable recording medium includes magnetic recording device, optical disc, magneto-optical recording medium, semiconductor memory, etc. Such a magnetic recording device may be hard disc drive (HDD), flexible disc (FD), magnetic tape, etc. As the optical disc, DVD (Digital Versatile Disc), DVD-RAM (Random Access Memory), CD-ROM (Compact Disc Read Only Memory), CD-R (Recordable)/RW (ReWritable) or the like may be used. The magneto-optical recording medium includes MO (Magneto-Optical disc) etc.

To distribute the program, portable recording media, such as DVD and CD-ROM, on which the program is recorded may be put on sale. Alternatively, the program may be stored in the storage device of a server computer and may be transferred from the server computer to other computers through a network.

A computer which is to execute the program stores in its storage device the program recorded on a portable recording medium or transferred from the server computer. Then, the computer reads the program from its storage device and performs processes in accordance with the program. The computer may read the program directly from the portable recording medium to perform processes in accordance with the program. Also, as the program is transferred from the server computer, the computer may sequentially perform processes in accordance with the program.

As described above, according to the present invention, the initialization counter indicating the number of times the database has been initialized is updated at the time of initialization, and when data is allocated to a unit storage region, the then-counted value of the initialization counter is set as the allocation-timed counter value of the unit storage region to which the data has been allocated. Accordingly, even in the event the content of the use management book is destroyed, whether data has been allocated to the individual unit storage regions or not can be determined by comparing the value of the initialization counter with each of the allocation-timed counter values of the respective unit storage regions, thereby to restore the use management book. This makes it possible to restore the use management book without the need to perform physical initialization at the time of reinitialization, and the database initialization can be completed in a very short period of time.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium having a database management program recorded thereon for causing a computer to execute operations including managing allocation/non-allocation of data to individual unit storage regions of a database by a use management book, said operations comprising:

setting, when the database is initialized, all of allocation flags provided in the use management book and indicative of allocation/non-allocation of data to respective unit storage regions to a non-allocated state, and updating a value of an initialization counter indicative of a number of times the database has been initialized;

setting, each time data is allocated to one of the unit storage regions in the database, the allocation flag in the use management book corresponding to data-allocated unit storage region to an allocated state, and setting the value of the initialization counter as an allocation-timed counter value associated with the data-allocated unit storage region, the allocation-timed counter value being indicative of a number of times the database has been initialized when the data-allocated unit storage region is allocated;

comparing each of allocation-timed counter values set in the database in association with the respective unit storage regions with the value of the initialization counter in response to content of the use management book being destroyed; and restoring the use management book by setting, to the allocated state, the allocation flags associated with unit storage regions whose allocation-timed counter values coincided with the value of the initialization counter as a result of comparison, and setting, to the non-allocated state, the allocation flags associated with unit storage regions whose allocation-timed counter values did not coincide with the value of the initialization counter.

2. The computer-readable recording medium having the database management program according to claim 1, wherein, when the database is to be initialized, a determination is made as to whether or not the database is in a state before physical initialization, and only if the database is in the state before physical initialization, the database is physically initialized.

3. The computer-readable recording medium having the database management program according to claim 2, wherein a state flag is provided which is indicative of an initialization state of the database, and said operations further comprise:

setting the state flag to a structure-defined state in response to a data structure of the database being defined; and physically initializing the database on concluding that the database is in the state before physical initialization, and setting the state flag to an initialized state upon completion of the physical initialization, in response to the state flag indicating the structure-defined state when the database is to be initialized.

4. The computer-readable recording medium having the database management program according to claim 1, wherein the database includes a plurality of databases for storing data in sequence while being switched, and while data is stored in one database, other databases in which data has been stored are backed up and initialized, respectively.

5. An apparatus for managing use/nonuse of individual unit storage regions of a database using a management book, comprising:

means for non-allocation flag setting, when the database is initialized, all of allocation flags provided in a use management book and associated with respective unit storage regions to a non-allocated state;

means for initialization counter updating, when the database is initialized, a value of an initialization counter indicative of a number of times the database has been initialized;

means for allocated-state setting, each time data is allocated to one of the unit storage regions in the database, an allocation flag in the use management book corresponding to the a data-allocated unit storage region to an allocated state;

means for allocation-timed counter value setting, each time data is allocated to one of the unit storage regions in the database, the value of the initialization counter as an allocation-timed counter value associated with the data-allocated unit storage region, the allocation-timed counter value being indicative of a number of times the database has been initialized when the data-allocated unit storage region is allocated; and means for allocation-timed counter comparing, in response to content of the use management book being destroyed, each of allocation-timed counter values set in the database in association with the respective unit storage regions with the value of the initialization counter;

wherein, in response to the content of the use management book being destroyed, the allocated-state setting means restores the use management book by setting, to the allocated state, the allocation flags associated with unit storage regions whose allocation-timed counter values coincided with the value of the initialization counter as a result of the comparison, and setting, to the non-allocated state, the allocation flags associated with unit storage regions whose allocation-timed counter values did not coincide with the value of the initialization counter.

6. A database management method for managing use/nonuse of individual unit storage regions of a database using a use management book, the method comprising:

setting to a non-allocated state, when the database is initialized, all of allocation flags provided in the use management book and indicative of allocation/non-allocation of data to respective unit storage regions, and updating a value of an initialization counter indicative of a number of times the database has been initialized; and setting to an allocated state, each time data is allocated to one of the unit storage regions in the database, the allocation flag in the use management book corresponding to the data-allocated unit storage region, and setting the value of the initialization counter as an allocation-timed counter value associated with the data-allocated unit storage region, the allocation-timed counter value being indicative of a number of times the database has been initialized when the data-allocated unit storage region is allocated;

comparing, in response to content of the use management book being destroyed, each of allocation-timed counter values set in the database in association with the respective unit storage regions with the value of the initialization counter; and restoring the use management book by setting allocation flags associated with unit storage regions whose allocation-timed counter values coincided with the value of the initialization counter to the allocated state, and setting the allocation flags associated with unit storage regions whose allocation-timed counter values did not coincide with the value of the initialization counter to the non-allocated state.

* * * * *

UNITED STATES PATENT AND TRADEMARK OFFICE
CERTIFICATE OF CORRECTION

| | | |
|---|---|---|
| PATENT NO. | : 7,376,678 B2 | Page 1 of 1 |
| APPLICATION NO. | : 10/118147 | |
| DATED | : May 20, 2008 | |
| INVENTOR(S) | : Minoru Yamanaka et al. | |

It is certified that error appears in the above-identified patent and that said Letters Patent is hereby corrected as shown below:

IN THE CLAIMS

Column 17, line 55, change "…to the a data-allocated…" to --…to a data-allocated…--;

Column 18, line 33, delete "and"

Signed and Sealed this

Eighteenth Day of November, 2008

JON W. DUDAS
*Director of the United States Patent and Trademark Office*